(12) United States Patent
Castaldi et al.

(10) Patent No.: US 12,367,371 B2
(45) Date of Patent: Jul. 22, 2025

(54) SYSTEM FOR IDENTIFYING, LOCALIZING AND STORING HISTOLOGY CASSETTES AND SLIDES

(71) Applicants: IT HEALTH FUSION S.R.L., Naples (IT); Giuseppe Castaldi, Apice (IT); Antonello Cutolo, Forio-Ischia (IT); Vincenzo Galdi, Benevento (IT); Paolo Mattera, Benevento (IT); Roberto Parente, Cerreto Sannita (IT); Andrea Cusano, Caserta (IT)

(72) Inventors: Giuseppe Castaldi, Apice (IT); Antonello Cutolo, Forio-Ischia (IT); Vincenzo Galdi, Benevento (IT); Paolo Mattera, Benevento (IT); Roberto Parente, Cerreto Sannita (IT); Andrea Cusano, Caserta (IT); Davide Rosiello, Naples (IT); Antonio Armenante, Cava de' Tirreni (IT); Fernando Rosiello, Naples (IT); Alessandro Di Minno, Naples (IT)

(73) Assignees: IT HEALTH FUSION S.R.L., Naples (IT); Giuseppe Castaldi, Apice (IT); Antonello Cutolo, Forio-Ischia (IT); Vincenzo Galdi, Benevento (IT); Paolo Mattera, Benevento (IT); Roberto Parente, Cerro Sannita (IT); Andrea Cusano, Caserta (IT)

( * ) Notice: Subject to any disclaimer, the term of this patent is extended or adjusted under 35 U.S.C. 154(b) by 278 days.

(21) Appl. No.: 17/997,934

(22) PCT Filed: May 4, 2021

(86) PCT No.: PCT/IB2021/053729
§ 371 (c)(1),
(2) Date: Nov. 4, 2022

(87) PCT Pub. No.: WO2021/224788
PCT Pub. Date: Nov. 11, 2021

(65) Prior Publication Data
US 2023/0169300 A1 Jun. 1, 2023

(30) Foreign Application Priority Data
May 4, 2020 (IT) .................. 102020000009706

(51) Int. Cl.
*G06K 19/077* (2006.01)
*B01L 3/00* (2006.01)
*G06K 7/10* (2006.01)

(52) U.S. Cl.
CPC ........ *G06K 19/07758* (2013.01); *B01L 3/545* (2013.01); *G06K 7/10356* (2013.01); *G06K 19/07713* (2013.01)

(58) Field of Classification Search
CPC ......... G06K 19/07758; G06K 7/10356; G06K 19/07713; B01L 3/545
See application file for complete search history.

(56) References Cited

U.S. PATENT DOCUMENTS

| | | | | |
|---|---|---|---|---|
| 8,981,907 B1 * | 3/2015 | Lavache | ............ | G06K 7/10356 235/382 |
| 9,274,034 B2 * | 3/2016 | Berberich | ................ | G01N 1/31 |

(Continued)

FOREIGN PATENT DOCUMENTS

| CN | 209515199 U | 10/2019 |
|---|---|---|
| JP | 2005339507 A | 8/2005 |

(Continued)

OTHER PUBLICATIONS

International Search Report and Written Opinion for corresponding International Patent Application No. PCT/IB2021/053729 dated Aug. 13, 2021. 14 pages.

(Continued)

*Primary Examiner* — Chico A Foxx
(74) *Attorney, Agent, or Firm* — Leason Ellis LLP

(57) ABSTRACT

A system (100) for storing, identifying and localizing supports (20, 21) for tissue samples embedded in paraffin, comprising—a plurality of supports (20, 21), wherein each one is provided with a respective RFID tag (201), said supports (20, 21) being each a histology cassette (20) configured to contain a tissue sample embedded in paraffin, or a slide (21); —a plurality of trays (1), wherein each tray (1) is provided with a respective RFID tag (101), and is configured to contain a plurality of said supports (20, 21), ach tray (1) being provided with a plurality of seats (11), each seat (11) being configured to receive a respective support (20, 21) and each support (20, 21) being adapted to be arranged at a respective seat (11); —at least one compo- (Continued)

nent (3) provided with a plurality of RFID antennas (10, 31), said plurality of RFID antennas (10, 31) comprising an RFID antenna (10) for reading the RFID tag (101) of a tray (1) of said plurality of trays, and RFID antennas (31) for reading the RFID tags (201) of the supports (20, 21); —at least one RFID interrogator (4); —one or more demultiplexers (5), by means of which the RFID interrogator (4) may be connected to each RFID antenna (10, 31) of said plurality of RFID antennas (10, 31), said one or more demultiplexers (5) being configured to sequentially activate a unique signal transmission line for each RFID antenna (10, 31) of said plurality of RFID antennas (10, 31); —an electronic control unit (6), configured to synchronize said one or more demultiplexers (5) and said at least one RFID interrogator (4) with one another, to sequentially read the RFID tags (210) of the supports (20, 21) and the RFID tag (101) of a tray (1) of said plurality of trays by means of one RFID antenna (10, 31) at a time, of said plurality of RFID antennas (10, 31).

26 Claims, 12 Drawing Sheets

(56) References Cited

U.S. PATENT DOCUMENTS

| | | | |
|---|---|---|---|
| 2002/0030598 A1* | 3/2002 | Dombrowski | G08B 13/2445 340/572.1 |
| 2005/0205673 A1* | 9/2005 | Morris | G01N 35/00732 235/385 |
| 2007/0216532 A1* | 9/2007 | Lansdowne | B01L 9/02 340/572.1 |
| 2008/0068173 A1* | 3/2008 | Alexis | H04B 5/48 340/572.7 |
| 2008/0150691 A1* | 6/2008 | Knadle | H01Q 15/0013 340/10.1 |
| 2008/0186174 A1* | 8/2008 | Alexis | G07G 1/009 340/572.1 |
| 2010/0167334 A1* | 7/2010 | Williamson, IV | G16H 10/40 235/487 |
| 2012/0169470 A1* | 7/2012 | Lee | G06K 19/07749 340/10.1 |
| 2014/0187448 A1* | 7/2014 | O'Banion | B01L 3/545 204/600 |
| 2017/0286903 A1* | 10/2017 | Elizondo, II | G06K 7/1413 |

FOREIGN PATENT DOCUMENTS

| | | | |
|---|---|---|---|
| WO | 2006109211 A1 | 10/2006 | |
| WO | WO-2010004332 A1 * | 1/2010 | B01L 9/52 |

OTHER PUBLICATIONS

International Preliminary Report on Patentability for corresponding International Patent Application No. PCT/IB2021/053729 dated May 11, 2022. 20 pages.

Italian Search Report for corresponding Italian Patent Application No. 102020000009706 dated Jan. 13, 2021. 8 pages.

* cited by examiner

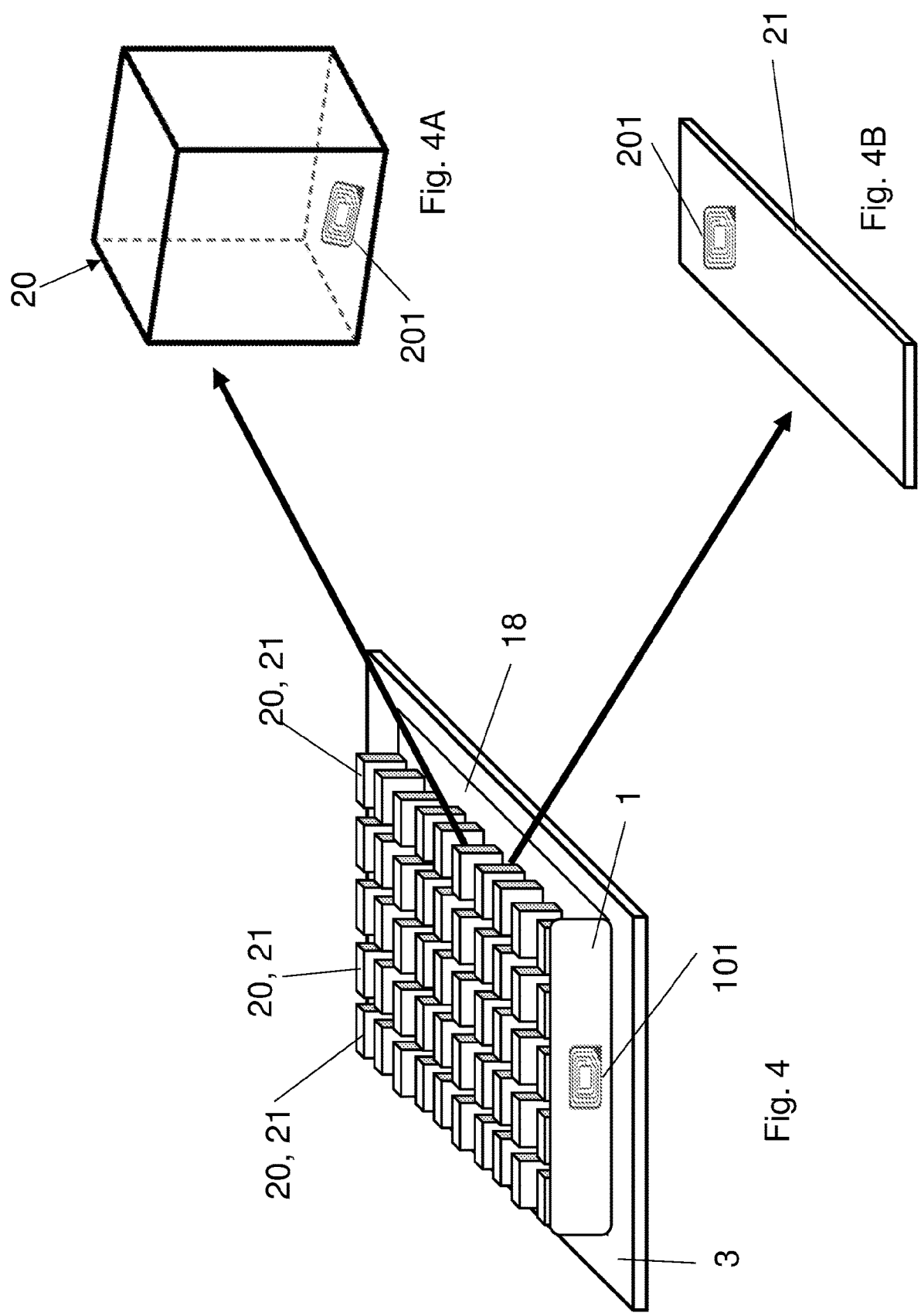

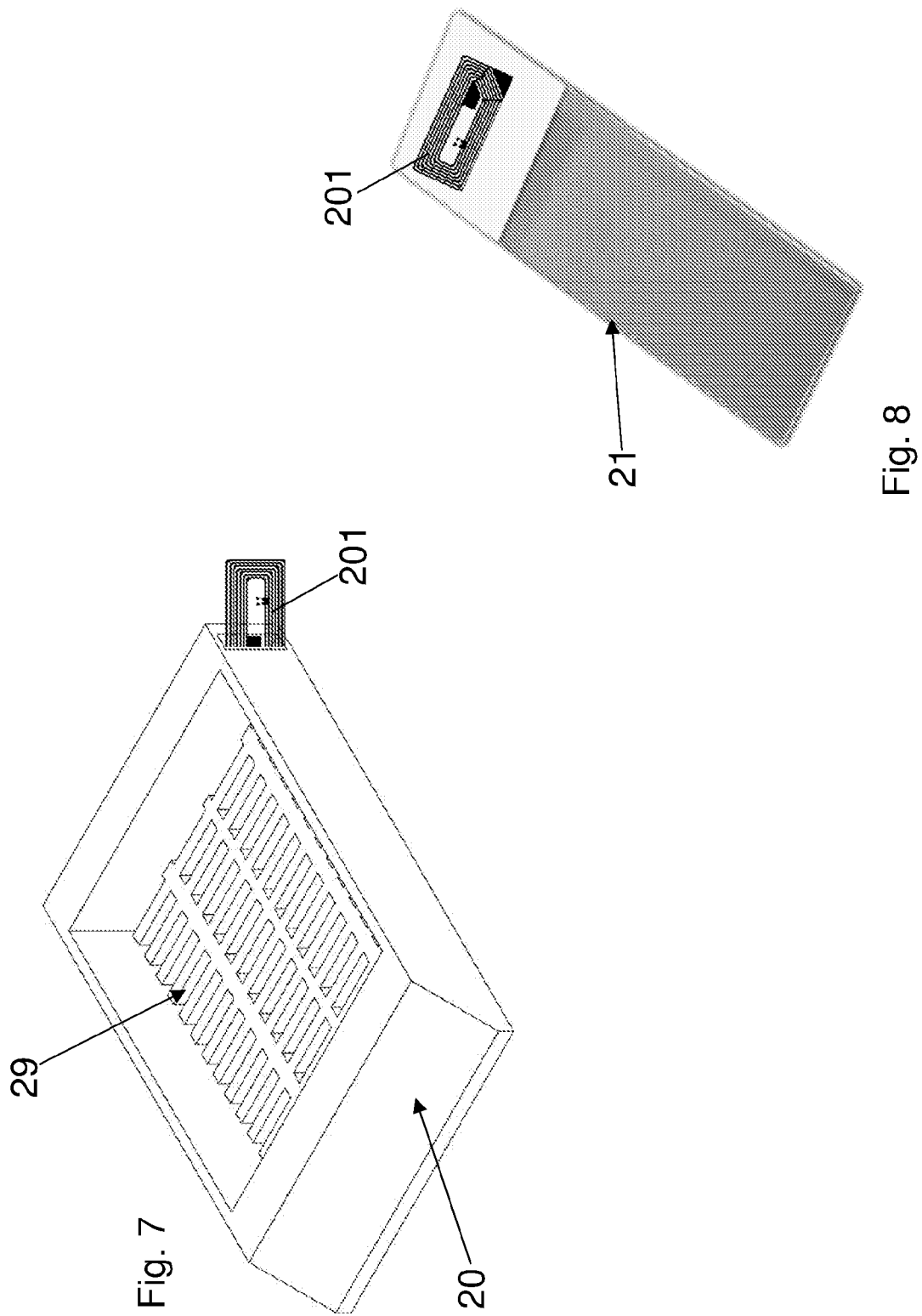

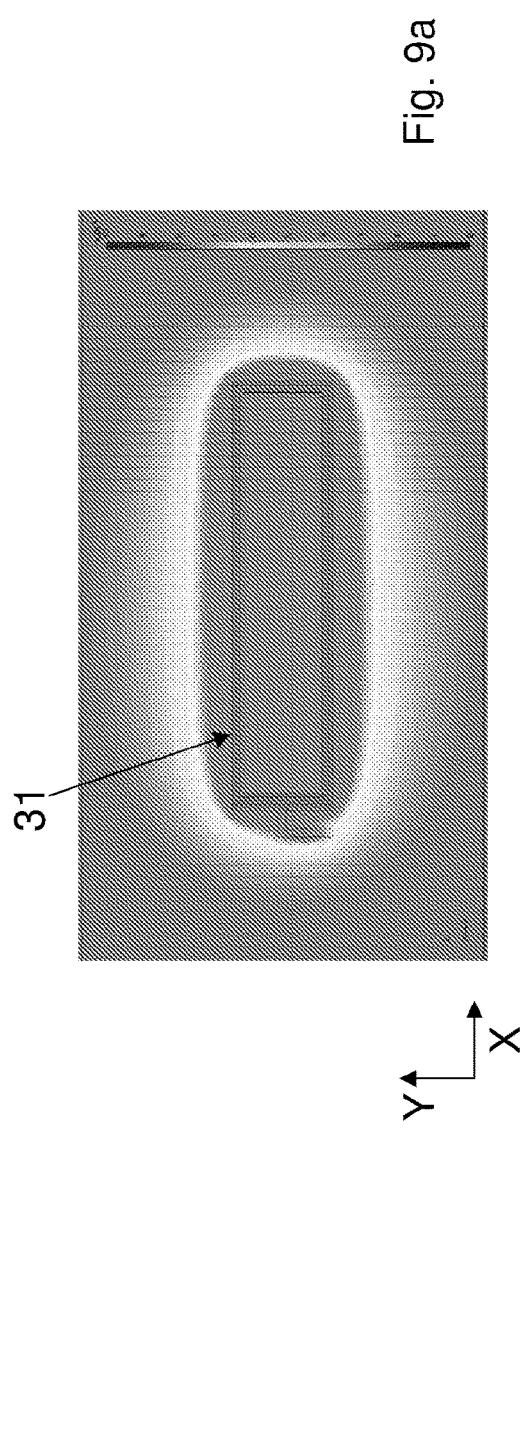
Fig. 9a
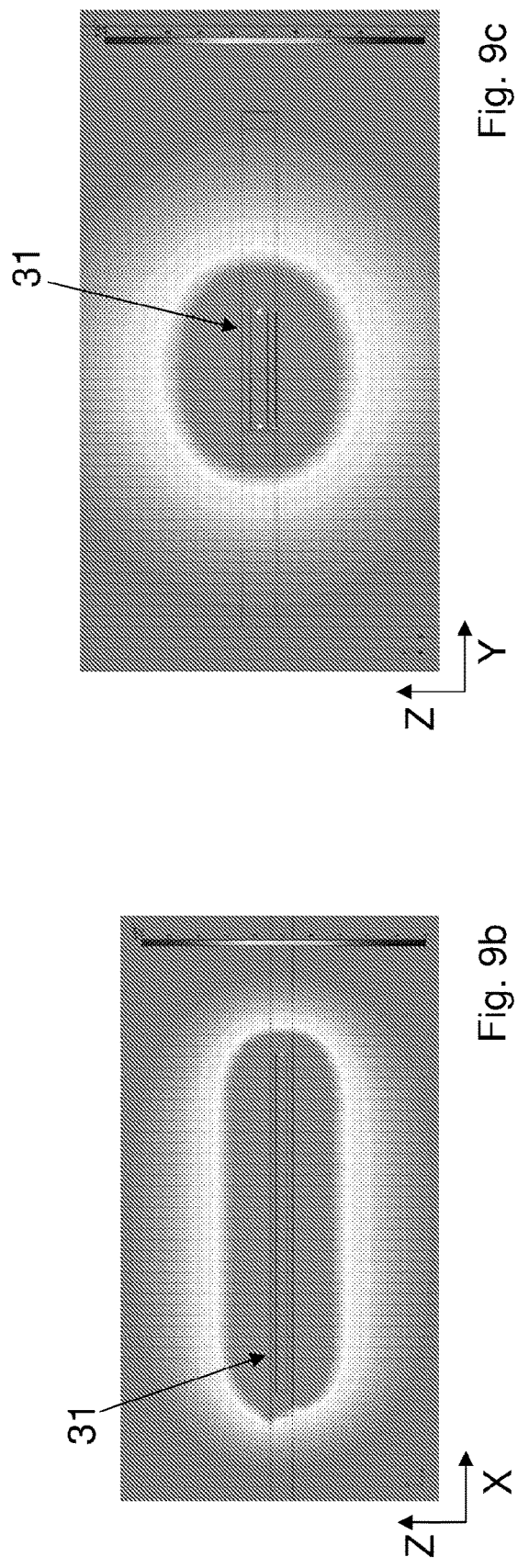
Fig. 9c
Fig. 9b

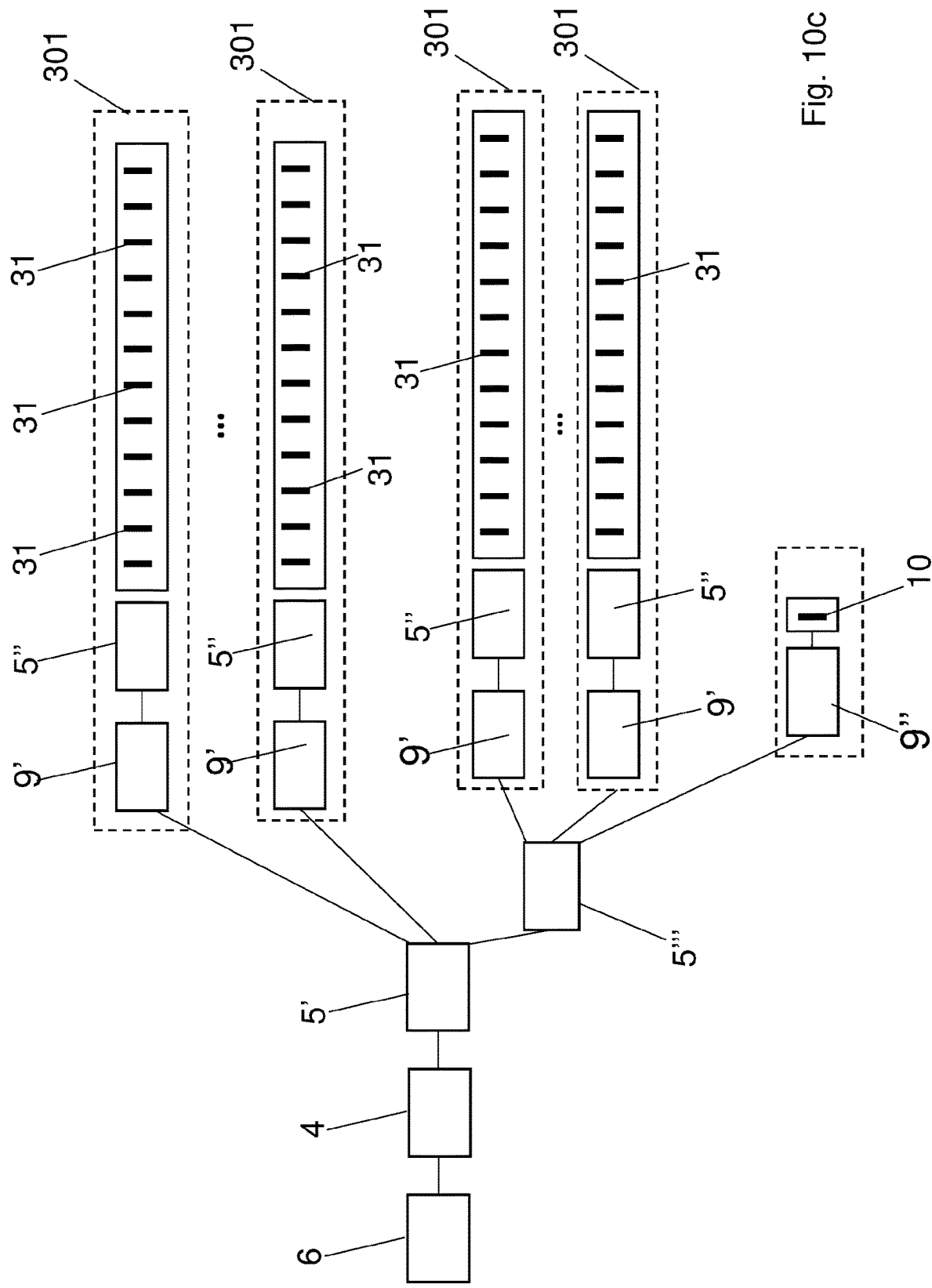

SYSTEM FOR IDENTIFYING, LOCALIZING AND STORING HISTOLOGY CASSETTES AND SLIDES

CROSS-REFERENCE TO RELATED PATENT APPLICATIONS

This application is a U.S. National Stage Application under 35 U.S.C. § 371 of International Patent Application No. PCT/IB2021/053729 filed May 4, 2021, which claims the benefit of priority of Italian Patent Application No. 102020000009706 filed May 4, 2020, both of which are incorporated by reference in their entireties. The International Application was published on Nov. 11, 2021, as International Publication No. WO 2021/224788 A1.

FIELD OF THE INVENTION

The present invention relates to the field of the storage of biological samples, in particular histology samples, more in particular biological tissue samples.

In particular, the invention relates to a system which allows identifying, localize and trace the supports, in particular histology cassettes or slides, for the samples and therefore the samples themselves.

BACKGROUND ART

In clinical practice, it is often necessary to collect biological samples from a patient, for example portions of tissues.

The biological samples are subjected to different types of analyses, for example tissue samples may be used for histological analyses.

Conventionally, the tissue samples undergo fixation, washing and dehydration procedures. They are then embedded in paraffin to preserve the chemical properties of the sample. Thereby, the samples are preserved so as to be processed in the future, even after years.

The samples are placed in cassettes of a standard shape and size, typically made of acetal resin.

Such cassettes are also known as histology cassettes or tissue embedding cassettes.

For histological analysis, the tissue samples in paraffin are cut with the microtome so as to obtain sections thereof of a few microns, which are penetrable by light and therefore observable under the microscope following staining with stains or with reagents adapted to highlight the presence of molecular markers and verify the integrity of the tissue structures. For this purpose, the cut sections are fixed on laboratory slides.

Conventionally, a very large number of samples—varying, for example, between a few hundred and many tens of thousands—is sorted, classified and stored manually in numbered trays having such constructive properties as to facilitate the accommodation and retrieval thereof. The process for identifying a specific sample to be collected is also manual. The trays are individually labeled and accommodated in cabinets or, in any case, containers of a larger size in which they must in turn be positioned and traced so as to facilitate the retrieval and collection thereof.

The procedure is therefore slow and subject to human error.

The unique identification of each sample and the traceability (tracing) thereof are a set of critical operations extremely important in the healthcare practice, whose automation would be advantageous, with a view to optimize processes and computerize clinical risk management.

Having a system which allows automating and simplifying the identification of the sample to be collected would be advantageous.

The creation of such a system is not trivial, in particular when the number of samples is very high.

In particular, it is not trivial to create a system which can function reliably. Document JP2005339507A describes a system wherein laboratory test tubes are provided with a Radio Frequency IDentification tag (RFID), and wherein a reader provided with antennas for the RFID tags of the tubes is provided.

The system described in JP2005339507A is not suitable for processing a very large number of biological samples.

Furthermore, disadvantageously, the system described in JP2005339507A is not energy efficient, is expensive to make and has many components subject to breakage.

In fact, in JP2005339507A a switch is provided, and between the switch and each antenna a respective impedance matching network is provided, comprising one or more capacitors, one or more transistors and possibly one or more switches and one or more resistors. Therefore each antenna is disadvantageously provided with a respective impedance matching network (each impedance matching network comprising a capacitor and other elements) which is arranged between the switch and the body of the antenna. In other words, the number of impedance matching networks is equal to the number of antennas.

Thereby, an (active) antenna is brought to the same resonant frequency, called the first resonant frequency, as the RFID tag, while all the other antennas are brought to a second resonant frequency, which is different from said first resonant frequency.

Therefore, all the other antennas are at the second resonant frequency, except one antenna which is at the first resonant frequency equal to the resonant frequency of the RFID tag. Thereby, the RFID tag should only communicate with the antenna which is at the same resonant frequency thereof.

Document US2002/030598A1 describes a slide provided with an RFID tag and a multiwell plate provided with an RFID tag. Each well of the multiwell plate is specifically configured to accommodate a very small amount of liquid and is destined to be used as a reaction vessel.

SUMMARY OF THE INVENTION

It is an object of the present invention to provide a system which allows storing, identifying and localizing a very large number of tissue samples to be subjected to histological analysis, i.e., histology samples.

In particular, it is an object of the invention to provide a system which allows a quick and reliable identification and localization of samples.

The present invention achieves at least one of such objects and other objects which will become apparent in light of the present description, by means of a system for storing, identifying and localizing supports for tissue samples embedded in paraffin—or more precisely a system for identifying, localizing and storing histology cassettes or histology slides—comprising a plurality of supports, wherein each one is provided with
        a respective RFID tag, said supports being each
    a histology cassette configured to contain a tissue sample
        embedded in paraffin, or a slide;
    a plurality of trays, wherein each tray is provided with a respective RFID tag, and is configured to contain a plurality of said supports, each tray being provided with a plurality of seats, each seat being configured to receive a respective support and each support being adapted to be arranged in a respective seat;

at least one component provided with a plurality of RFID antennas, said plurality of RFID antennas comprising an RFID antenna for reading the RFID tag of a tray of said plurality of trays, and RFID antennas for reading the RFID tags of the supports;

at least one RFID interrogator;

one or more demultiplexers, by means of which the RFID interrogator can be connected to each RFID antenna of said plurality of RFID antennas, said one or more demultiplexers being configured to sequentially activate a unique signal transmission line for each RFID antenna of said plurality of RFID antennas;

an electronic control unit, configured to synchronize said one or more demultiplexers and said at least one RFID interrogator with one another, to sequentially read the RFID tags of the supports and the RFID tag of a tray of said plurality of trays by means of one RFID antenna at a time, of said plurality of RFID antennas.

A histology cassette provided with an RFID tag is one aspect of the present invention.

A tray configured to hold histology cassettes or slides provided with an RFID tag is one aspect of the present invention.

Advantageously, the system allows identifying and localizing samples even in the presence of debris, for example paraffin, which may possibly hide numbered labels, for example on the sample support or tray.

Advantageously, the system allows identifying and localizing samples very quickly and reliably inside trays. For example, the identification and localization of about 250 samples in a tray can be performed in about 20 seconds.

Advantageously, the system does not require an extremely precise positioning of the support in the respective seat of the tray.

Advantageously, the system does not require moving mechanical parts to identify and localize the samples.

Advantageously, the RFID reading occurs sequentially on different RFID antennas, allowing the system, in addition to perform normal identification, to know the position of an RFID tag, and therefore of a biological sample, in particular an histology sample, on the tray.

Advantageously, the system offers the possibility of querying the single RFID antennas, arranged, in particular, according to a dense matrix, without interfering with the adjacent antennas. This is made possible, in particular, by said one or more demultiplexers, capable of sequentially activating a unique transmission line for each RFID antenna, in particular, so that only one antenna at a time is electrically connected to the RFID interrogator, while the other RFID antennas are electrically disconnected from the RFID interrogator. Reading errors and interference between antennas are therefore drastically reduced.

Advantageously, the system is capable of reliably reading the RFID tags, both of the supports and of the tray, even in the event of: poor lighting conditions; presence of paraffin or other substances on the sample support surface and/or on the tray; imperfect positioning of the sample support; wear or corrosion of the surfaces involved in the reading process.

The RFID antennas are, in particular, designed to have a limited reading volume.

Advantageously, the RFID antennas are capable of reading the data contained in an RFID tag, in particular, the identification serial number of the tag. Every single RFID antenna may be queried by the RFID reader by using one or more demultiplexers. For example, the RFID interrogator may be connected to the input, in particular to the single input, of the demultiplexer and the RFID antennas may be connected to the outputs of the demultiplexer.

When more than one demultiplexer is provided, at least some of the demultiplexers are, in particular, connected to each other in cascade, in particular, so that the input of one demultiplexer is connected to the output of another demultiplexer. The one or more demultiplexers are capable of selecting towards which RFID antenna is the connection to be created. To operate the demultiplexer, and select, from time to time, which RFID antenna will connect with the RFID reader, the electronic control unit is used. The data obtained from the reading are subsequently sent to an IT system, for example a computer, which is capable of storing the data received.

Advantageously, each tray is provided with a respective RFID tag. An advantage of this feature is given by the fact that the tray can be identified, for example, inside a trayholder cabinet. Preferably, the cabinet is also provided with an RFID tag. For example, a plurality of cabinets may be provided, each provided with a respective RFID tag.

Advantageously, the system of the invention is the optimal solution for tracing histology cassettes and slides for histology samples, by means of the recognition of the ID, and for accessing the data relating to the patient (without however managing the personal data thereof, but operating by means of an association with the relevant case ID).

Any information managed by the system database can be made available to all other applications and equipment involved in the process.

Key processes requiring traceability include cassette and slide management, in particular, in terms of position within a single tray and trays, for example, within a single cabinet, as well as within the hospital, both during the exchange between hospitals and during conservation.

Advantageously, the system of the invention allows the unique identification and the traceability of the samples throughout the cycle, from collection to processing, to storage.

For example, biological samples collected in operating theaters and specialist clinics may be accompanied by a large set of information to be sent to the pathological anatomy department.

At the end of the process, the pathological anatomy report is returned to the doctor treating the patient and the sample is archived. Advantageously, it is possible to associate the ID of the single sample with the histopathological data of the patient. Since the samples originate from a variety of different sources, it is necessary for the information to be correctly associated with the samples, so as to reduce clinical risk.

The pathological anatomy laboratory must be capable of tracing each step of the process in detail, ensuring that it is completed in the correct sequence. The system allows tracing histology cassettes and tissue slides with the aid of RFID technology.

This aspect is extremely advantageous, in particular with respect to systems which are instead based on the reading of two-dimensional codes by a scanner. In such systems, the two-dimensional code is printed on the histology cassette by means of particular printers which may be thermal transfer or laser printers. In both cases, the printer prints directly onto the plastic of the cassette. Slides may be coded in a similar manner. The scanner simply reads the code that the laser or thermal transfer printer has printed directly on the cassette.

It has been found that often in these systems some of the codes are not read.

Quite often it happens that the code is unreadable by the scanner, in particular because it has been printed ineffectively and/or due to the presence of paraffin debris. In most cases, the code is unreadable by the scanner because it is poorly printed, sometimes half-printed. In some other cases the code is unreadable by the scanner due to uncleaned paraffin debris on the cassette, in particular, on the side of the printed part, therefore, although being visible to the human eye, in the photo taken by the scanner, the reflection effect of the paraffin prevents the reading of the code.

Such issues are instead solved by means of the system of the invention, which is not affected by issues due to the presence of paraffin or the imprecise printing of a code.

Advantageously, the reading system allows, after having associated the case ID, which was generated at the acceptance of the operating piece, with the RFID tag associated with the cassette or slide, to simultaneously archive a multitude of cassettes or slides (and, therefore, of samples), tracing the position thereof and associating them with a tray and preferably with the cabinet in which they are stored.

The invention therefore allows facilitating and speeding up the routine work of the technical staff and the pathologists, greatly reducing the possibility of human error. Another laboratory process for the analysis of biological samples is the subdivision of a single sample into several sub-samples. By means of the system of the invention, it is possible to keep track of the origin of the generated sub-samples, which, for example, are arranged on slides.

Advantageously, the system allows reading, in an efficient and reliable manner, information relating to histology cassettes or slides where tissue samples embedded in paraffin are arranged, and information relating to the tray containing the histology cassettes or the slides. Thereby, it is possible to precisely identify and localize a specific sample arranged in a specific histology cassette or on a specific slide among a multitude of samples distributed among a plurality of trays.

The system may be equipped with a simple and intuitive user interface.

Further features and advantages of the invention will become more apparent in light of the detailed description of non-exclusive embodiments.

The dependent claims describe particular embodiments of the invention.

BRIEF DESCRIPTION OF THE DRAWINGS

In the description of the invention, reference is made to the accompanying drawings, which are provided by way of non-limiting example, in which:

FIG. 4 diagrammatically shows a perspective view of some components of the system according to the invention;

FIG. 4A diagrammatically shows a perspective view of an example of a component of the system according to the invention;

FIG. 4B diagrammatically shows a perspective view of another example of a component of the system according to the invention;

FIG. 7 shows a perspective view of a possible component of a system according to the invention;

FIG. 8 shows a perspective view of a possible component of a system according to the invention;

FIGS. 9a, 9b, 9c show the result of simulations relating to the component of FIG. 9;

FIG. 10c shows a circuit diagram of another particular example of a system according to the invention;

The same elements, or functionally similar or equivalent elements, have the same reference numeral.

DESCRIPTION OF EXAMPLE EMBODIMENTS OF THE INVENTION

Figure 1:
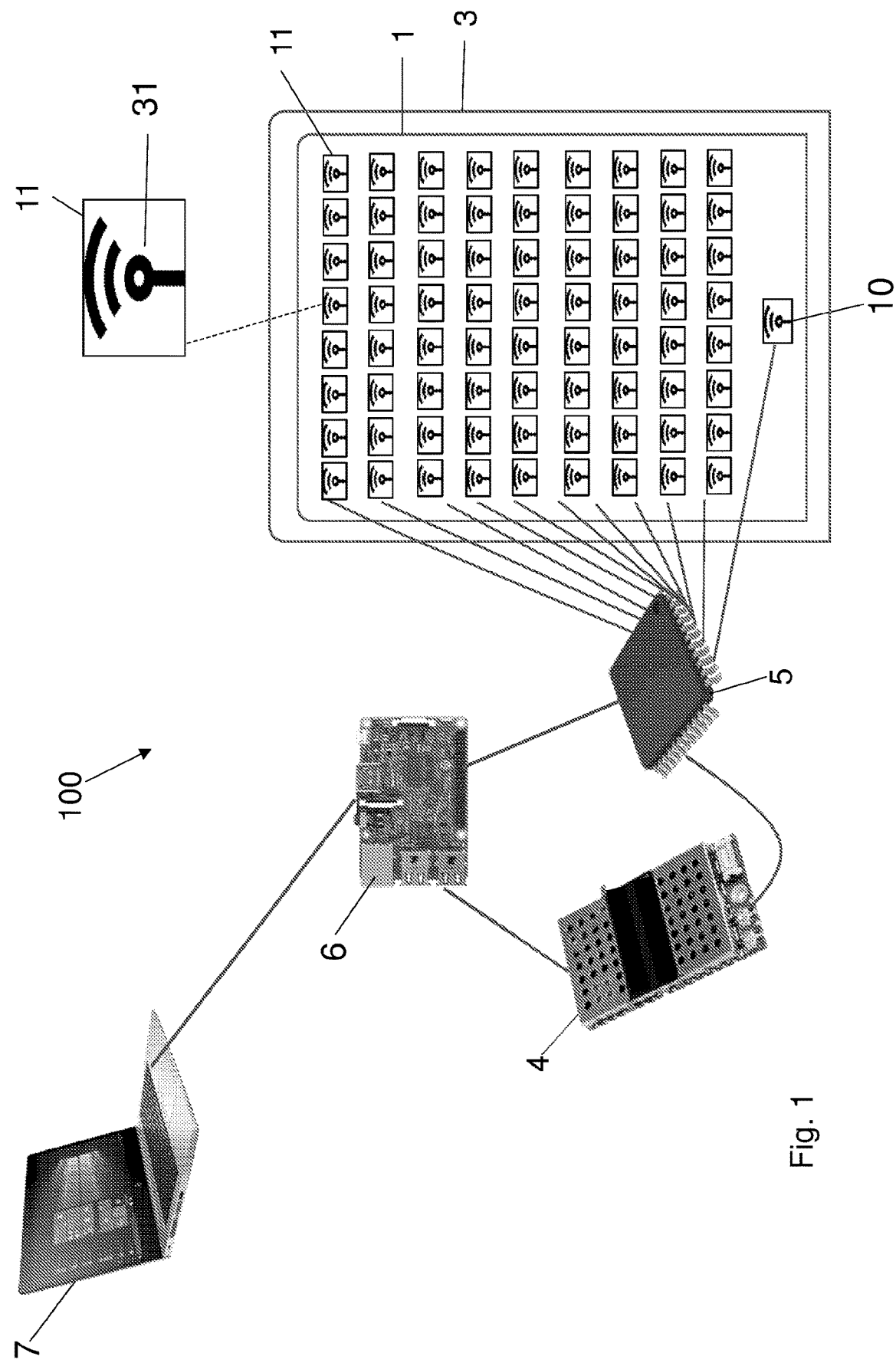
FIG. 1 diagrammatically shows an example of a system according to the invention.

With reference to the Figures, embodiments of a system or apparatus according to the invention are described.

The system 100 is used in particular for storing, identifying and localizing biological samples, in particular, histology samples.

More specifically, the system 100 is used for storing, identifying and localizing histology cassettes 20 containing tissue samples embedded in paraffin or slides 21 on which tissue samples embedded in paraffin are arranged. The system 100 comprises a plurality of supports 20, 21, wherein each one is provided with a respective RFID tag 201,
said supports 20, 21 being each
a histology cassette 20 configured to contain a tissue sample embedded in paraffin, or a slide 21 on which a tissue sample embedded in paraffin may be arranged;
a plurality of trays 1,
wherein each tray 1 is provided with a respective RFID tag 101, and is configured to contain a plurality of said supports 20, 21,
each tray 1 being provided with a plurality of seats 11, each seat 11 being configured to receive a respective support 20, 21 and each support 20, 21 being adapted to be arranged in a respective seat 11;
at least one component 3 provided with a plurality of RFID antennas 10, 31, 32, said plurality of RFID antennas 10, 31, 32, 33 comprising an RFID antenna 10 for reading the RFID tag 101 of a tray 1 of said plurality of trays, and RFID antennas 31, 32, 33 for reading the RFID tags 201 of the supports 20, 21;
at least one RFID interrogator 4;
one or more demultiplexers 5, 5', 5", 5''', by means of which the RFID interrogator 4 may be connected to each RFID antenna 10, 31, 32, 33 of said plurality of RFID antennas 10, 31, 32, 33, said one or more demultiplexers 5 being configured to sequentially activate a unique signal transmission line for each RFID antenna 10, 31, 32, 33 of said plurality of RFID antennas 10, 31, 32, 33;

an electronic control unit 6, configured to synchronize said one or more demultiplexers 5 and said at least one RFID interrogator 4 with one another, to sequentially read the RFID tags 210 of the supports 20, 21 and the RFID tag 101 of a tray 1 of said plurality of trays by means of one RFID antenna 10, 31, 32, 33 at a time, of said plurality of RFID antennas 10, 31, 32, 33.

The histology cassettes 20 are, in particular, cassettes for histological inclusions and are also referred to as tissue embedding cassettes. For descriptive purposes, in the present description the histology cassettes 20 may also be referred to as cassettes 20. Preferably, each cassette 20 has a conventional size and/or a conventional shape. Preferably each cassette 20 has a width from about 28 to 53 mm; a length from about 48 to 71 mm, and a thickness from about 6 to 19 mm.

For example, a cassette 20 may have a size of about 28.5 mm×41 mm×6 mm, or about 52.5 mm×75 mm×18.3 mm, or about 52.3 mm×75 mm×9.5 mm.

Preferably, the bottom of each cassette 20 is formed by a perforated grid 29 (FIG. 7).

The slides 21 are in particular histology slides, or laboratory slides.

Each slide 21 preferably has a size (length×width) of about 76×26 mm or 76×52 mm.

Preferably, each tray 1 has a width from 30 to 50 cm; a length from 20 to 40 cm; and preferably a thickness from 2 to 10 cm.

The supports may be supports for biological samples in general, said supports being, for example, test tubes or bags, for example, bags for containing blood, or containers, such as for example the aforesaid cassettes, or slides.

Preferably, the seats 11 are arranged according to a matrix or grid.

Exclusively by way of example, the tray 1 may comprise a number of seats 11 from 2 to 4096 or from 100 to 4096 or from 100 to 600 or from 200 to 300.

The seats 11, in particular, are in positions which facilitate the reading of the RFID tags 201 by means of the RFID antennas 31, 32, 33.

The seats 11 may, for example, be housings.

Figure 6:
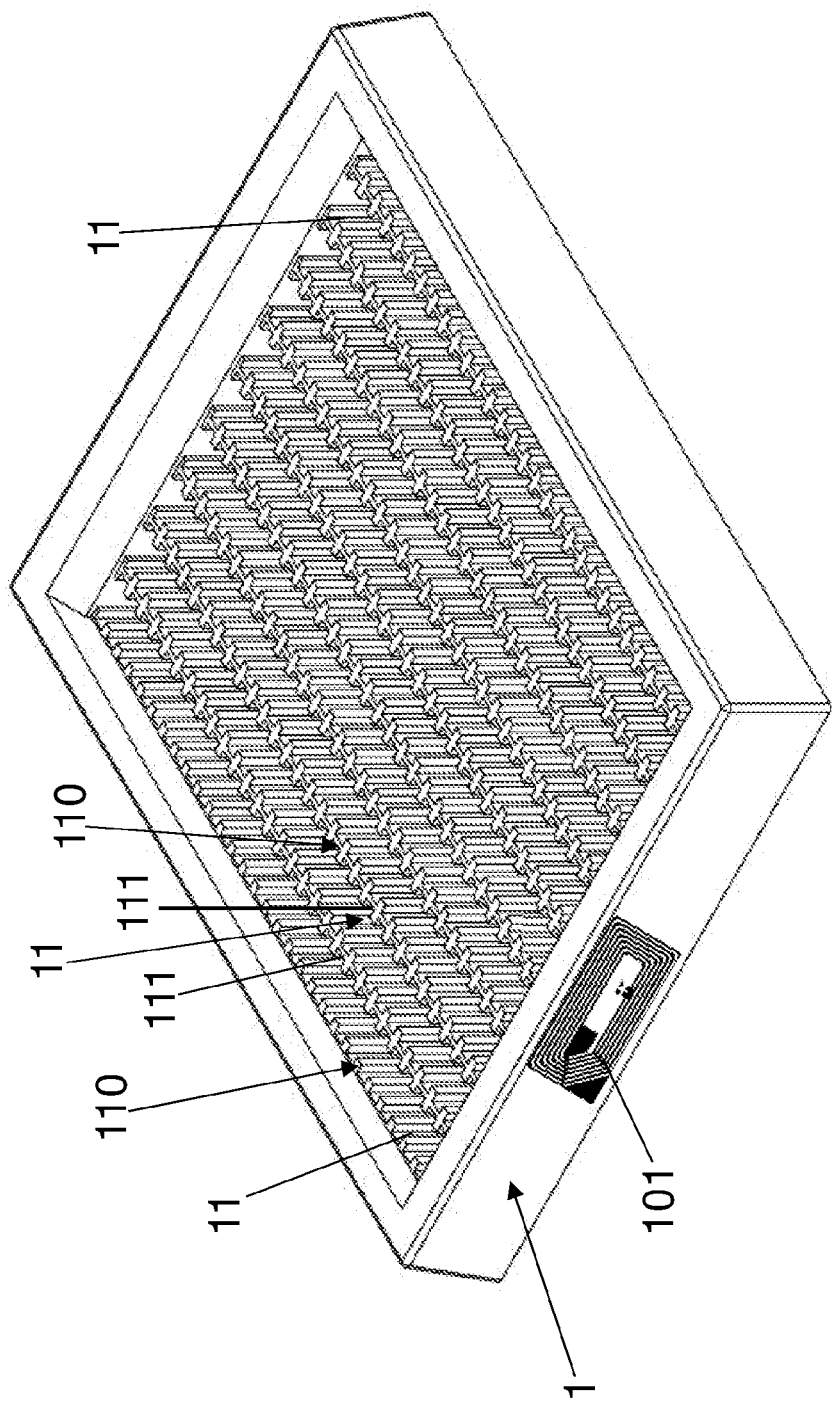
FIG. 6 shows a perspective view of a particular example of a component of a system according to the invention.

For example, in all the embodiments, a tray 1 comprises a plurality of internal walls 110 (FIG. 6) which are parallel and spaced apart, provided with a plurality of grooves 111; and wherein each pair of grooves 111 facing each other defines at least part of a seat 11 for a support 20, 21, for example, for a histology cassette 20.

Each support 20, 21 is configured to be inserted in a pair of grooves 111 facing each other.

The supports 20, 21 may be positioned at, in particular inside, the respective seat 11 and may be removed from the tray 1.

For each support 20, 21, the RFID tag 201 is preferably arranged at the part of the support 20, 21 destined to be rested on the tray 1.

In particular, each RFID tag 201 is fixed to a respective support 20, 21.

In particular, each RFID tag 201 is preferably incorporated in a respective cassette 20, in particular in the part of the respective cassette 20 destined to be resting on the tray 1. For example, the RFID tag 201 may be incorporated in a wall, for example a base, of the cassette 20.

For the slides 21, the respective RFID tag 201 may be fixed thereto, and the RFID tag 201 may substantially be, for example, a label.

The tray 1 may, for example, be configured to be arranged inside a cabinet 8, the latter being preferably provided with an own RFID tag 801 thereof. In this case, the system 100 preferably further comprises an RFID antenna for reading the RFID tag 801 of the cabinet 8.

Advantageously, the system comprises a plurality of trays 1.

Advantageously, each tray 1 is provided with a respective RFID tag 101 and the system 100 comprises at least one RFID antenna 10, preferably a single RFID antenna 10, for reading the RFID tag 101 of the tray 1, connected to said RFID interrogator 4 by means of said one or more demultiplexers 5.

The RFID tag 101 of each tray 1 and the respective antenna 10 allow, in particular, identifying a set of supports 20, 21 (and relative samples), in particular, a set of supports 20, 21 to be analyzed.

Advantageously, an RFID antenna 10 is provided for each component 3 with which the system 100 may be provided.

The RFID antenna 10 is distinct from the RFID antennas 31, 32, 33.

Preferably, the RFID tags 101, 201 are of the passive type, although they may also be of the active type.

The RFID antennas 31, 32, 33 are used, in particular, for identifying and localizing the supports 20, 21, in particular, the unique RFID tag 201 associated with each support 20, 21.

The RFID antenna 10 is used, in particular, for identifying and localizing each tray 1, in particular the unique RFID tag 101 associated with each tray 1.

Preferably, the RFID antennas 10, 31, 32 33 are Near Field Communication (NFC) antennas.

Preferably, in particular in order to limit interference, the RFID tag 201 of each support 20, 21 is an NFC tag; the RFID tag 101 of each tray 1 is an NFC tag; said at least one RFID interrogator 4 is an NFC interrogator; and said RFID antennas 10, 31, 32, 33 of said plurality of RFID antennas are NFC antennas.

Preferably, each RFID antenna 10, 31, 32, 33 has a thickness from 20 µm to 2 cm, or from 0.4 mm to 3.2 mm.

Advantageously, as already mentioned, each component 3, in addition to the RFID antennas 31, 32, 33 further comprises at least one RFID antenna 10, preferably a single RFID antenna 10, to read the RFID tag 101 of a tray 1, for example, of a respective tray 1.

Preferably, each component 3 further comprises one or more demultiplexers 5.

The component 3 is in particular an electronic component, for example a printed circuit or electronic board.

Figure 5:
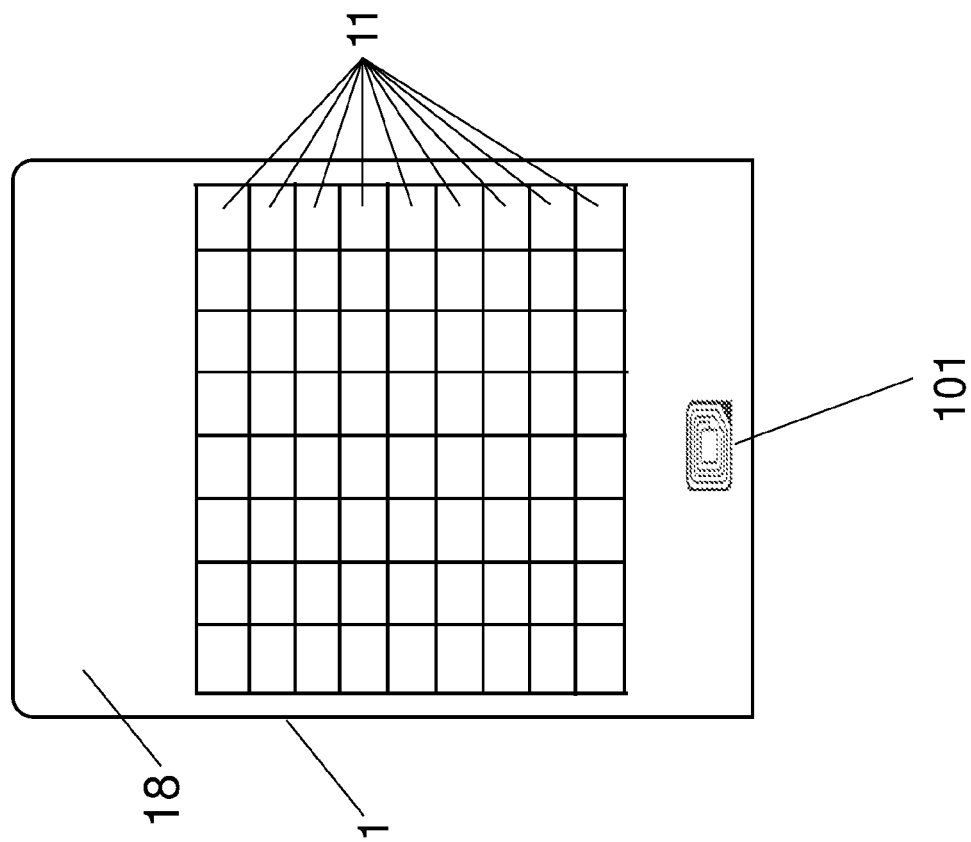
FIG. 5 diagrammatically shows a plant view of a component of the system according to the invention.

Preferably, in use, the component 3 is arranged below the resting surface 18 (FIGS. 4, 5), or base surface, of the tray 1. In particular, the RFID antennas 10, 31, 32, 33 are arranged below the resting surface 18 of the respective tray 1.

The resting surface 18 of the tray 1 is preferably flat.

Preferably, the RFID antennas 10, 31, 32, 33 are arranged on the same surface or on several surfaces, distinct from one another, preferably parallel to one another.

The surface where the RFID antennas 10, 31, 32, 33 are arranged may be flat or curved. When the surface where the RFID antennas 10, 31, 32, 33 are arranged is flat, the surface is preferably parallel to the resting surface 18 of the tray 1.

Preferably, the RFID antennas 31, 32, 33 are arranged so that the distance, in particular the center-center distance, between the RFID antennas 31, 32, 33 is from 3 to 300 mm or from 5 to 15 mm.

Preferably, a structure is provided, for example a cabinet 8 or a trolley, where, in particular, the tray/s 1 and the component/s 3 may be arranged.

Figure 2:
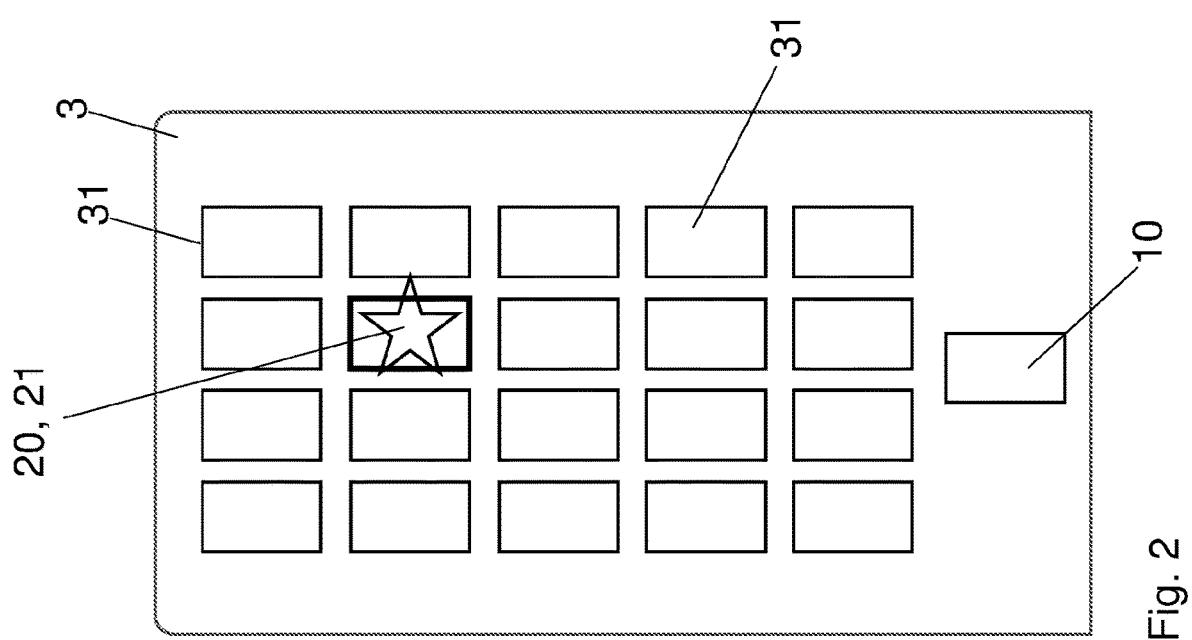
FIG. 2 diagrammatically shows a plan view of an example of some components of a system according to the invention.

With particular reference to FIGS. 1 and 2, in a particular example, an RFID antenna 31 is provided for each support 20, 21, i.e., an RFID antenna 31 is provided for each seat 11.

Therefore, a single RFID antenna 31 is provided for each possible position for a support 20, 21. Therefore, there is a bijection (one-to-one correspondence) between each RFID antenna 31 activated by a demultiplexer 5 and the respective support 20, 21 in question.

Preferably, the RFID antennas 31 are arranged according to a matrix or grid, in particular, as the seats 11.

In particular, the system 100 is configured so that each RFID antenna 31 may be arranged at a respective seat 11 of the tray 1. In other words, each RFID antenna 31 corresponds to a respective possible position for a support 20, 21. More in detail, preferably, when the tray 1 is arranged on the component 3, each RFID antenna 31-seat 11 pair is crossed by the same respective axis, said axis being, in particular, perpendicular to the resting surface 18 of the tray 1. When the support 20, 21 is arranged at the seat 11, the RFID tag 201 is also preferably crossed by said axis.

The RFID antenna 10 and the RFID tag 101 of the tray 1 are preferably adapted to be arranged at each other, i.e., substantially aligned with each other.

The RFID antennas 31 are preferably arranged on the same surface.

Preferably, each RFID antenna 31 has a width from 1 to 100 mm or from 4 to 40 mm or from 15 to 35 mm, and/or a length from 1 to 200 mm or from 4 to 40 mm or from 3 to 10 mm.

Advantageously, by sequentially reading the RFID tags 210 of the supports 20, 21 and the RFID tag 101 of the tray 1 by means of one RFID antenna 10, 31 at a time, a specific support 20, 21 may be identified, for example, the support diagrammatically shown as a star in FIG. 2. Furthermore, the RFID tag 101 of the tray 1 is read and, in particular, identified.

Figure 3:
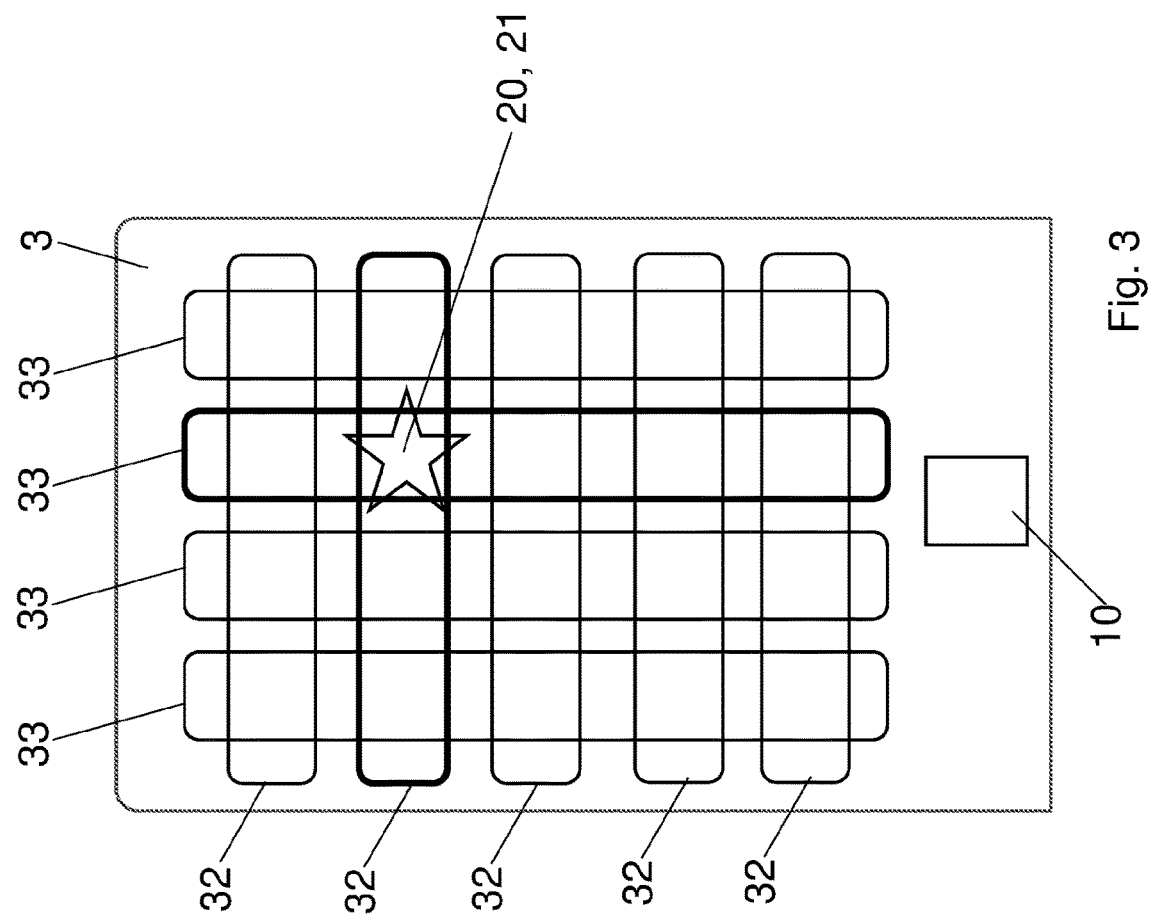
FIG. 3 diagrammatically shows a plan view of another example of some components of a system according to the invention.

With particular reference to FIG. 3, in another particular example, instead of the antennas 31, the RFID antennas 32, 33 are provided, which define the rows and columns of a grid, so that at each seat 11 two RFID antennas 32, 33 are provided.

In particular, the RFID antennas 32 define the rows of the grid, and the RFID antennas 33 define the columns of the grid.

The RFID antennas 32 and the RFID antennas 33 extend at more than one seat 11.

The intersection areas, i.e., the overlapping areas, between the RFID antennas 32 and the RFID antennas 33 are at a respective seat 11.

Exclusively by way of example, the RFID antennas 32 are arranged on the same surface and the RFID antennas 33 are arranged on the same surface, arranged above or below the surface on which the RFID antennas 32 are arranged.

The RFID antennas 32 and the RFID antennas 33 may be part of the same component 3 or of two different components 3.

Each antenna 32 is capable of identifying the row on which a support 20, 21 is positioned, and each antenna 33 is capable of identifying the column on which a support 20, 21 is positioned.

Advantageously, by sequentially reading the RFID tags 210 of the supports 20, 21 and the RFID tag 101 of the tray 1 by means of one RFID antenna 32, 33 at a time, a specific support 20, 21 may be identified, for example, the support diagrammatically shown as a star in FIG. 3. Furthermore, the RFID tag 101 of the tray 1 is read and, in particular, identified.

The position of the support 20, 21 arranged at a respective seat 11 is identified, in particular, by crossing the obtained detection data.

Preferably, each RFID antenna 32, 33 has a width from 5 mm to 1 m or from 10 mm to 500 mm, and/or a length from 5 mm to 1 m or from 10 mm to 500 mm.

In all the embodiments, each RFID interrogator 4 is preferably also capable of writing the RFID tags 101, 201.

In all the embodiments, to speed up the reading process, more than one RFID interrogator 4 may be provided. For example, an RFID interrogator 4 may be provided for each column of a certain number of RFID antennas 31, for example, of ten RFID antennas 31; or, for example, an RFID interrogator 4, adapted to read a part (for example, half) of the RFID antennas 31, 32, 33, and another RFID interrogator 4, adapted to read another part (for example half) of the RFID antennas 31, 32, 33, may be provided.

In all the embodiments, the electronic control unit 6 may be connected to a computer 7. The computer 7 is in particular provided with or adapted to be connected to an electronic memory, where information relating to the RFID tags 101, 201 may be stored.

A component 3, the electronic control unit 6, the one or more RFID interrogators 4 and the one or more demultiplexers 5 are part, in particular, of a reading apparatus or system.

Exclusively by way of example, by means of a component 3, the electronic control unit 6, the one or more RFID interrogators 4 and the one or more demultiplexers 5, it is advantageously possible to scan a plurality of trays 1 one at a time where respective supports 20, 21 are arranged.

The trays 1 may also be numbered in addition to being provided with a respective RFID tag 101.

In particular, each tray 1 where the samples are arranged is read and the information is saved in a database, for example the memory of the computer 7. The tray 1 is then placed, for example, in a cabinet 8. Thereby, even if after years it becomes necessary to reanalyze a sample, the software will indicate the number of the tray 1 and the position of the sample inside the tray 1, and possibly also the number of the cabinet 8. Exclusively by way of example and not by way of limitation, the system 100 may be controlled by means of a blockchain.

In particular, the data, preferably anonymized, may be recorded in a blockchain.

For example, it is possible to check the authenticity of the biological sample and keep track of all the movements thereof, memorizing the origin and destination of each transfer. All the interventions performed in the laboratory on the samples may also be recorded in the blockchain.

Furthermore, the system, preferably by means of a big data logic and/or by means of artificial intelligence and/or predictive tools, allows processing data related to the health of the population, and a unique support for research may be provided.

The anonymous information collected may be made available for research purposes to be used to improve the Precision Medicine Initiative (PMI).

Preferably, in all the embodiments, each RFID antenna 31, and preferably also each RFID antenna 10, has a Q factor greater than 10, preferably between 10 and 60, preferably between 20 and 40.

A Q factor greater than 10, i.e., a high Q factor, is particularly advantageous to obtain a limited reading volume and therefore to limit the interference between the antennas 10, 31 as much as possible.

Figure 9:
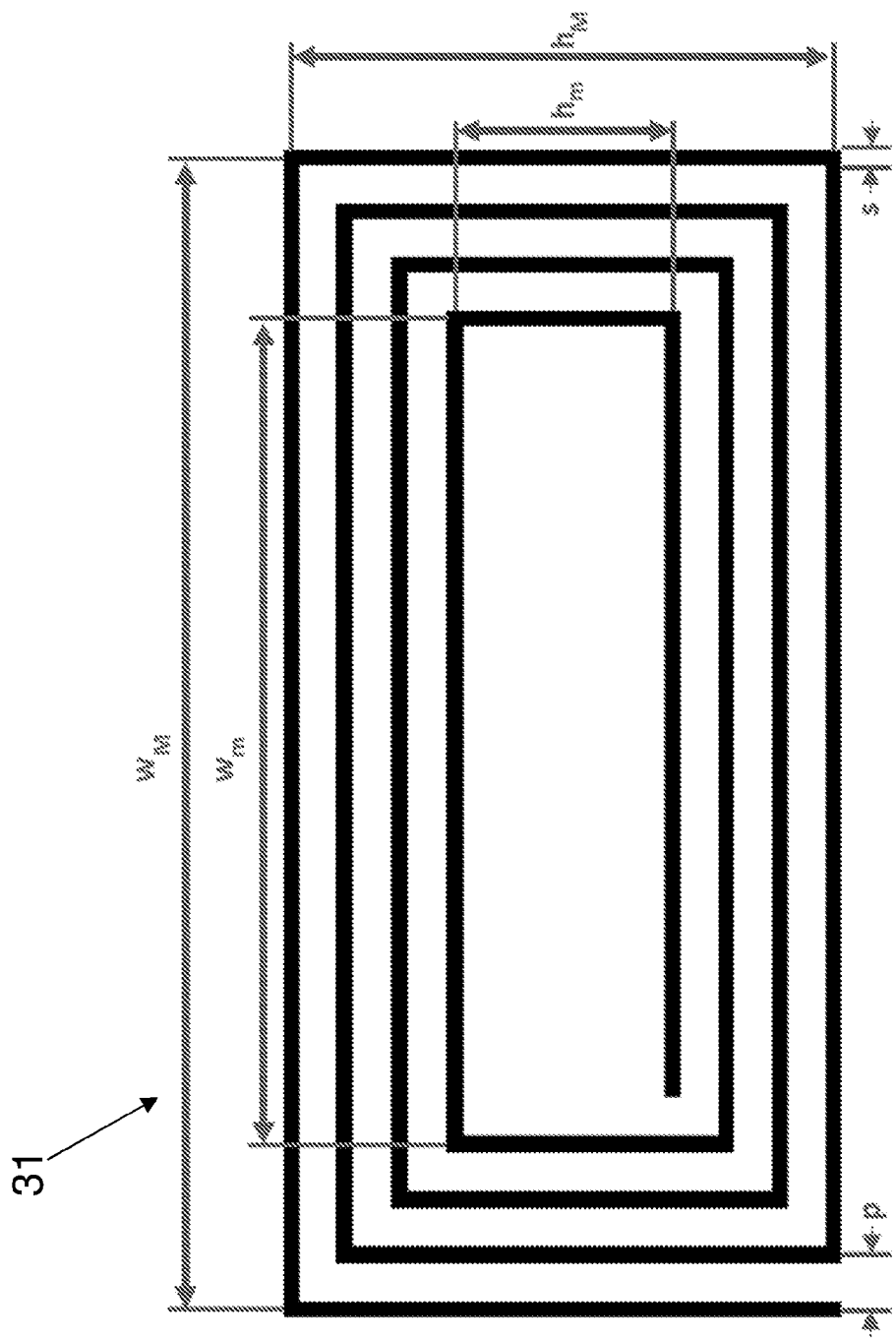
FIG. 9 shows a plan view of a particular example of a component of a system according to the invention.

With particular reference to FIG. 9, an example of antenna 31 having a Q factor equal to 29 has the following features.

The antenna 31 comprises an electrically conductive track, for example made of copper, provided with a plurality of coils.

The coils are rectangular or substantially rectangular. The number of coils is equal to 8.

The pitch p between the coils is equal to or about equal to 0.5 mm, where the pitch is, in particular, the distance between corresponding points between consecutive coils.

In this preferred example, it has been opted for 8 coils arranged on 4 levels, spaced apart by 0.5 mm so as to have an area inside the coil which is not penalized by the encumbrance of 8 coplanar coils. This ensures a more homogeneous and more intense magnetic field along the axis perpendicular to the plane of the antenna and exiting from the center of the antenna, with a compact design obtainable with a printed circuit with a thickness equal to or about equal to 1.6 mm and 4 copper layers.

The maximum width is indicated with reference $w_M$, the maximum width being the width of the outermost coil; the minimum width is indicated with reference $w_m$, the minimum width being the width of the innermost coil; the maximum height is indicated with reference $h_M$, the maximum height being the height of the outermost coil; and the minimum height is indicated with reference $h_m$, the minimum height being the height of the innermost coil. The width of the conductive track is indicated with reference s.

Niwa's formula has been implemented in a Matlab script, by virtue of which it has been possible to design a planar inductor having an inductance >1 μH, and a maximum size substantially equal to the size of a cassette 20 increased by 2 mm to accommodate the traces of the coils, and therefore having a maximum width $w_M$ of 30 mm and a maximum height $h_M$ of 10 mm.

Following the research, simulations, computer optimizations and tests carried out, a Q factor of 29 and a considerable reduction of the magnetic field on the center of the consecutive antennas was achieved.

FIGS. 9a, 9b, 9c show the result of a finite element numerical simulation (by means of the commercial software package Comsol Multiphysics) based on the particular example of antenna just described.

The generated magnetic field has been evaluated, in particular, the magnetic induction vector B has been considered.

The trend of the module of the magnetic induction vector B is shown in FIG. 9a on a plane parallel to the plane (xy) on which the antenna lies; it is shown in FIG. 9b, on an orthogonal plane (xz), longitudinal section; and it is shown in FIG. 9c, on an orthogonal plane (yz), transverse section.

By observing the graphs, it can be noticed that the magnetic field generated by the antenna 31 assumes the maximum value in the region of space above the antenna 31 and becomes negligible when moving away from the area delimited by the coils of the inductor (see plane xy). Rising from the antenna plane, at a distance of about 12 mm, the field drastically decays (see plane zy). The graph shows that the shape of the field is regular, and it does not show intensity variations or distortions in the reading region.

In a particularly preferred example, considering the antennas 31 arranged according to a matrix, the center-center distance between the antennas 31 is equal to about 11 mm.

In the light of the present description, the person skilled in the art is capable of designing antennas 10, 31 having a high Q factor, having features, in particular geometric features, different from those just described.

In all the embodiments, preferably, each demultiplexer 5, 5', 5", 5''' is provided with a single input and a plurality of outputs distinct from one another.

Figure 10A:
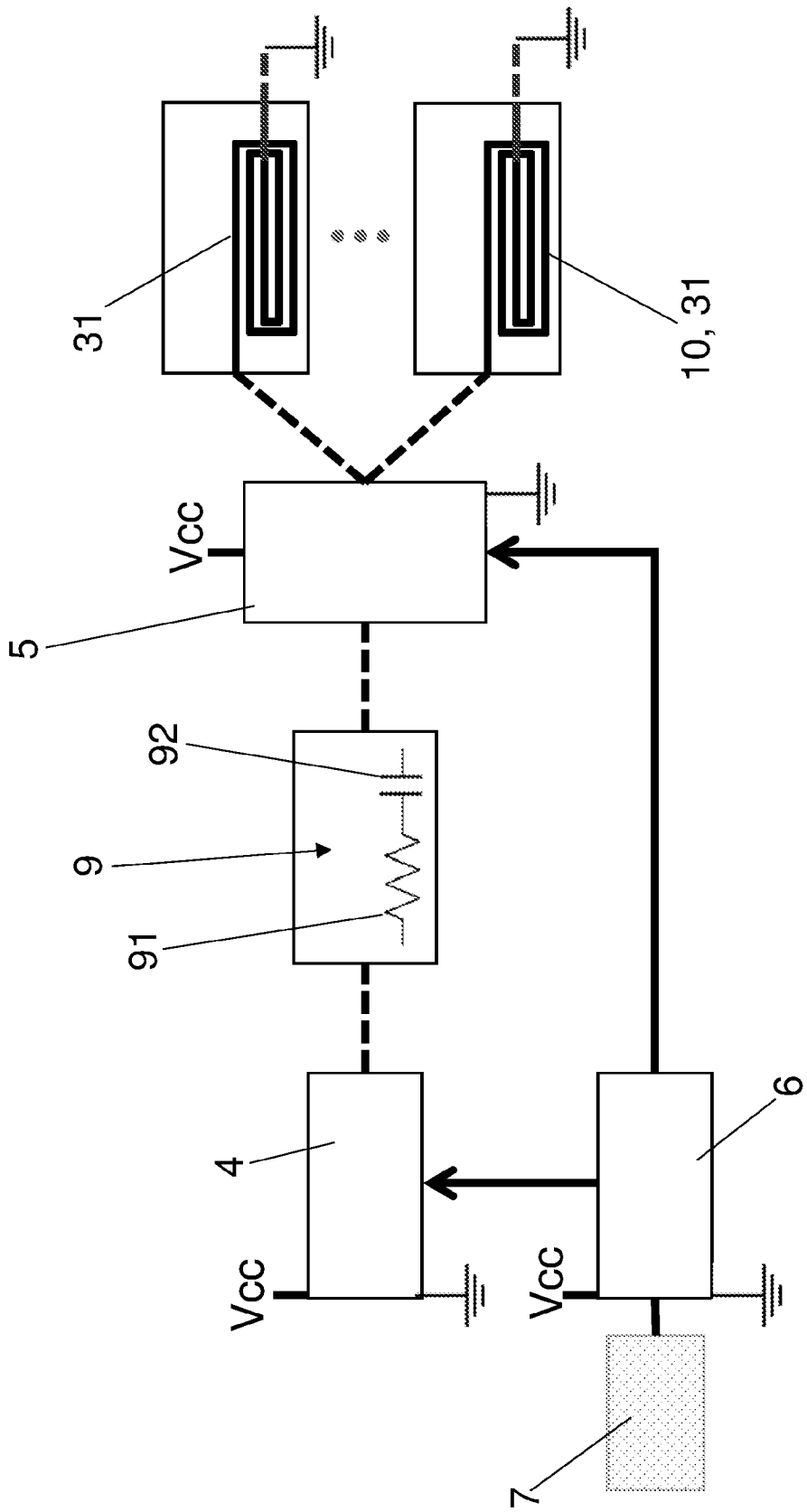
FIG. 10a shows a circuit diagram of a particular example of a system according to the invention.
Figure 10B:
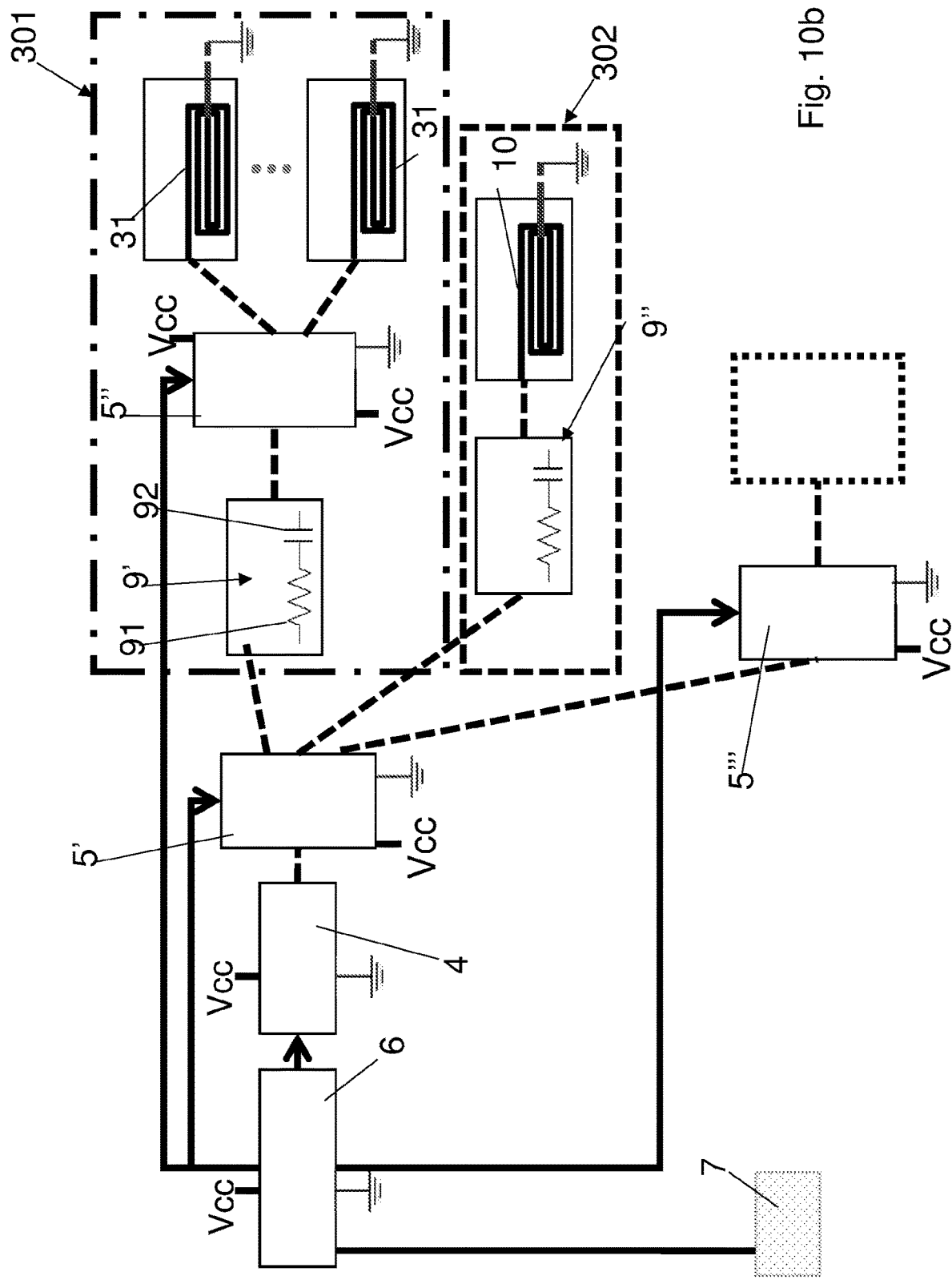
FIG. 10b shows a circuit diagram of another particular example of a system according to the invention.
Figure 11:
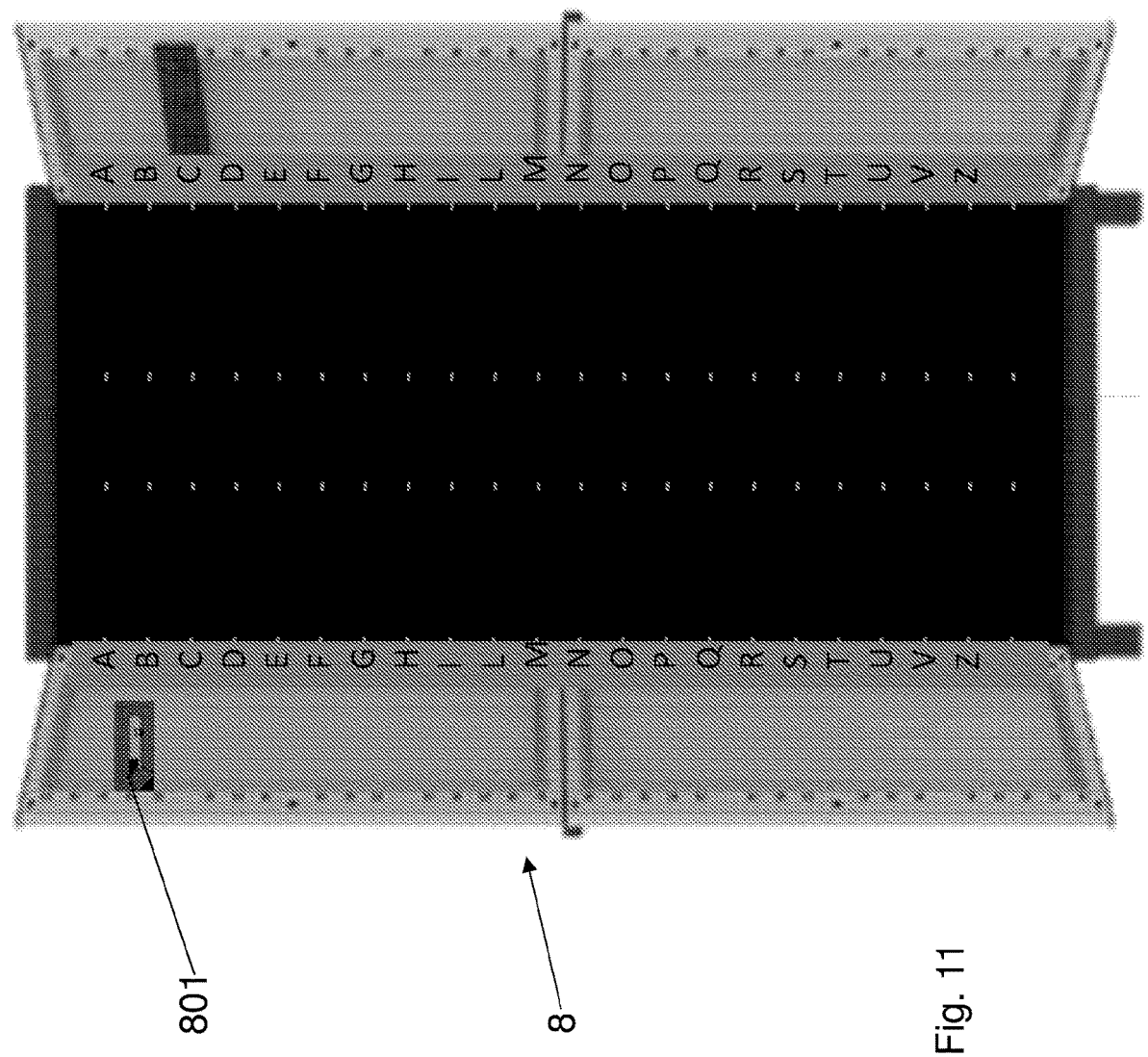
FIG. 11 shows a perspective view of a possible component according to the invention.

In all the embodiments, with particular reference to FIGS. 10a, 10b and 10c, preferably, the antennas 31 for reading the RFID tags 201 of the supports 20, 21 which are connected, in particular directly, to a respective output (distinct from one another) of the same demultiplexer 5, 5" of said one or more demultiplexers 5, 5', 5", 5''', have (i.e., are connected to) the same and unique impedance matching network 9, 9';

said impedance matching network 9, 9' comprises or consists of one or more resistors 91 and one or more capacitors 92, the impedance matching network 9, 9' being preferably non-reconfigurable;

and said impedance matching network 9, 9' is arranged between the RFID interrogator 4 and the input of said same demultiplexer 5, 5', in particular it is connected thereto.

In particular, said same demultiplexer 5, 5" is connected downstream of said same and unique impedance matching network 9, 9' and upstream of the antennas 31 which are connected to the outputs thereof.

In other words, said same demultiplexer 5, 5" is the first demultiplexer which is connected upstream of the antennas 31 which are connected to the outputs of the same demultiplexer 5, 5".

Thereby, it is preferably possible to provide that each single antenna 31 does not have a respective impedance matching network thereof, exclusively dedicated to a single antenna 31, by means of which each antenna may be connected to the demultiplexer. In other words, it can be provided that no impedance matching networks are present downstream of said same demultiplexer 5, 5".

Advantageously, therefore, a system is realized which is energetically efficient, economical to produce, and which has a low number of components subject to breakage. Optionally, the antenna 10 destined for reading, and optionally also for writing, the tag 101 of the tray 1 may include an impedance matching network 9''' dedicated thereto, in particular exclusively thereto, so as to provide a particularly reliable reading of the tag 101 of the tray 1.

With particular reference to FIG. 10b, optionally, the antenna 10 for reading the RFID tag 101 of the tray 1 is connected to an impedance matching network 9''', comprising or consisting of one or more resistors 91 and one or more capacitors 92, distinct from the impedance matching network 9, 9' for the antennas 31 for reading the RFID tags 201 of the supports 20, 21.

With particular reference to FIGS. 10b and 10c, the system comprises a first demultiplexer 5' of said one or more demultiplexers 5, wherein the RFID interrogator 4 is arranged between the electronic control unit 6 and said first demultiplexer 5' (i.e., electronic control unit 6 connected upstream of the RFID interrogator 4, and first demultiplexer 5' connected downstream of the RFID interrogator 4);

one or more first groups of components 301, wherein each first group of components 301 comprises, connected to one another, a first impedance matching network 9', a second demultiplexer 5" and antennas 31 for reading the RFID tags 201 of the supports 20, 21, each connected to a respective output of the second demultiplexer 5";

wherein a respective first group of components 301 is connected to a respective first output of the first demultiplexer 5' so that the respective first impedance matching network 9' is arranged between the first demultiplexer 5' and the respective second demultiplexer 5" (i.e., each first impedance matching network 9' is connected upstream of the respective second demultiplexer 5");

wherein each first impedance matching network 9' comprises or consists of one or more resistors 91 and one or more capacitors 92. Preferably, downstream of each second demultiplexer 9', no impedance matching network is provided.

The system further comprises a second group of components 302 which comprises, connected to one another, a second impedance matching network 9", distinct from the first impedance matching network 9' (or from each first impedance matching network 9'), and an antenna 10 for reading the RFID tag 101 of the tray 1;

wherein said second impedance matching network 9" comprises or consists of one or more resistors 91 and one or more capacitors 92.

With particular reference to FIG. 10b, said second group of components 302 is connected to a second output, distinct from each first output, of the first demultiplexer 5', so that the second impedance matching network 9" is arranged between the first demultiplexer 5' and said antenna 10 for reading the RFID tag 101 of the tray 1.

Optionally, the system comprises a third demultiplexer 5''' connected to an output of the first demultiplexer 5', distinct from each first output;

and wherein a respective first group of components 301 is connected to a respective output of the third demultiplexer 5''' so that the respective first impedance matching network 9' is arranged between the third demultiplexer 5''' and the respective second demultiplexer 5".

Said second group of components 302 may be connected to a second output, distinct from each first output, of the first demultiplexer 5' (FIG. 10b), so that the second impedance matching network 9" is arranged between the first demultiplexer 5' and said antenna 10 for reading the RFID tag 101 of the tray 1; or said second group of components 302 may be connected to a respective output of the third demultiplexer 5''' (FIG. 10c for example), so that the second impedance matching network 9" is arranged between the third demultiplexer 5''' and said antenna 10 for reading the RFID tag 101 of the tray 1.

Optionally, a further demultiplexer is connected to the third demultiplexer 5''', and one or more first groups of components 301 and/or the second group of components 302, and optionally still a further demultiplexer, and so on, are connected to a respective output of said further demultiplexer.

Exclusively by way of example and not by way of limitation, each demultiplexer 5" may have twelve outputs distinct from one another. Each antenna 31, in particular each of the twelve antennas 31, is connected to a respective output of the respective demultiplexer 5". The demultiplexer 5' has twelve outputs. Also the demultiplexers 5' and 5''' may, for example, have twelve outputs. A respective first group of components 301 is connected to eleven outputs of the demultiplexer 5', and the demultiplexer 5" (in cascade to the demultiplexer 5') is connected to the twelfth output. A respective first group of components 301 is connected to eleven outputs of the demultiplexer 5''', and the second group of components 302 is connected to the twelfth output.

In all the embodiments, said one or more demultiplexers 5 may preferably comprise two or more demultiplexers connected to one another in cascade, in particular, so that an output of a demultiplexer is connected to the input of the next demultiplexer, so as to define a cascade of demultiplexers. Preferably, one or more first groups of components 301 may be connected to each demultiplexer of the cascade, while a second group of components 302 may be connected to one of the demultiplexers of the cascade, preferably in the manner described above.

Advantageously, in use, the control unit 6 synchronously starts the readings (and/or writings) by means of the RFID interrogator 4 and varies the status of the demultiplexer 5 so as to sequentially query all the antennas 10, 31.

The control unit 6 configures the demultiplexer 5 (or the demultiplexers) so as to create an exclusive transmission line from the RFID interrogator 4 to the N-th antenna 10, 31.

In particular, with reference, for example, to FIG. 10a, the RF signal in the HF band generated by the RFID interrogator 4 reaches the antenna 31 by first crossing the impedance matching network 9 and then the demultiplexer 5 which connects the input thereof with one of the outputs, selected by the electronic control unit 6.

Preferably, the antennas 10, 31 consist of an inductor made with one or more metal coils, in particular with an internal area comparable to the size of the tag 101, 201 to be read, for example, having an internal area equal to the area occupied by the corresponding tag 101, 201.

The antennas 10, 31 are preferably passive, not reconfigurable, and advantageously they do not require dynamic controls and tuning.

Advantageously, in all the embodiments, said at least one RFID interrogator 4, said one or more demultiplexers 5, said electronic control unit 6, said impedance matching network 9 (or more impedance matching networks) and said antennas 10, 31 may be integrated on a single PCB.

Advantageously, to precisely localize the tag 101, 201, to avoid interference issues between the antennas 10, 31 and to substantially transfer all the rf power from the RFID interrogator 4 to the n-th antenna 10, 31, the system sequentially connects the RFID interrogator 4 to the antenna 10, 31 to be queried, while keeping all the other antennas disconnected, in particular electrically disconnected.

Optionally, to increase the number of antennas 31 which may be queried with a single RFID interrogator 4, further levels of demultiplexing may be provided by adding one or more demultiplexers 5 in cascade as explained above.

Advantageously, in all the embodiments, the system 100 is configured to read the position of each support 20, 21 in the tray 1 by means of the RFID antenna 31 at said support 20, 21, is configured to read the identification number of the RFID tag of each support 20, 21, and is configured to read the identification number of the RFID tag 101 of the tray 1 in which the support 20, 21 is arranged.

Preferably the system 100 is configured to store said position and said identification numbers in a database.

Optionally, in all the embodiments, the tags 201 of the supports 20, 21, in particular of the histology cassettes 20, are of the on-metal type, per se known.

In particular, it is preferable that each tag 201 is provided with a layer capable of absorbing and/or reflecting the electromagnetic field directed towards the sample embedded in paraffin. Therefore, the tag 201 may substantially communicate only in the direction of the RFID interrogator 4, while the sample is shielded from any electromagnetic fields emitted by the antenna 31 or by the tag 201 itself.

The invention claimed is:

1. A system for storing, identifying and localizing supports for tissue samples embedded in paraffin, comprising
   a plurality of supports, of which each one is provided with a respective RFID tag, said supports being each a histology cassette (20) configured to contain a tissue sample embedded in paraffin, or a slide;
   a plurality of trays,
   of which each tray is provided with a respective RFID tag, and is configured to contain a plurality of said supports,
   each tray being provided with a plurality of seats, each seat being configured to receive a respective support and each support being adapted to be arranged in a respective seat;
   at least one component provided with a plurality of RFID antennas,
   said plurality of RFID antennas comprising an RFID antenna for reading the RFID tag of a tray of said plurality of trays, and RFID antennas for reading the RFID tags of the supports;
   at least one RFID interrogator;
   characterized in that the system further comprises
   one or more demultiplexers, by means of which the RFID interrogator can be connected to each RFID antenna of said plurality of RFID antennas, said one or more demultiplexers being configured to sequentially activate a unique signal transmission line for each RFID antenna of said plurality of RFID antennas;
   an electronic control unit, configured to synchronize said one or more demultiplexers and said at least one RFID interrogator with one another, to sequentially read the RFID tags of the supports and the RFID tag of a tray of said plurality of trays by means of one RFID antenna at a time of said plurality of RFID antennas;
   in that the antennas for reading the RFID tags of the supports which are connected to a respective output of a same demultiplexer of said one or more demultiplexers have the same and unique impedance matching network;
   wherein said impedance matching network comprises or consists of one or more resistors and one or more capacitors;
   in that said impedance matching network is arranged between the RFID interrogator and the input of said same demultiplexer;
   and in that said same demultiplexer is connected downstream of said impedance matching network and upstream of the antennas connected to the outputs thereof.

2. The system according to claim 1, wherein each tray and said at least one component are distinct and separable from each other.

3. The system according to claim 1, wherein said electronic control unit is configured to synchronize said one or more demultiplexers and said at least one RFID interrogator with one another, to sequentially read the RFID tags of the supports and the RFID tag of said tray by means of one RFID antenna at a time, so that only one RFID antenna at a time is electrically connected to said at least one RFID interrogator by means of said one or more demultiplexers while the other RFID antennas are electrically disconnected from said at least one RFID interrogator.

4. The system according to claim 1, wherein the antenna for reading the RFID tag of the tray is connected to an impedance matching network, comprising or consisting of one or more resistors and one or more capacitors, distinct from the impedance matching network for the antennas for reading the RFID tags of the supports.

5. The system according to claim 1,
   comprising
   a first demultiplexer of said one or more demultiplexers, wherein the RFID interrogator is arranged between the electronic control unit and said first demultiplexer;
   one or more first groups of components,
   wherein each first group of components comprises, connected to one another,
   a first impedance matching network, a second demultiplexer and antennas for reading the RFID tags of the supports, each connected to a respective output of the second demultiplexer;
   wherein a respective first group of components is connected to a respective first output of the first demultiplexer so that the respective first impedance matching network is arranged between the first demultiplexer and the respective second demultiplexer;
   wherein each first impedance matching network comprises or consists of one or more resistors and one or more capacitors.

6. The system according to claim 5, comprising
   a second group of components which comprises, connected to one another, a second impedance matching network, distinct from the first impedance matching network, and an antenna for reading the RFID tag of the tray;
   wherein said second impedance matching network comprises or consists of one or more resistors and one or more capacitors.

7. The system according to claim 6, wherein said second group of components is connected to a second output, distinct from each first output, of the first demultiplexer, so that the second impedance matching network is arranged between the first demultiplexer and said antenna for reading the RFID tag of the tray.

8. The system according to claim 6, comprising a third demultiplexer connected to an output of the first demultiplexer, distinct from each first output;
   and wherein a respective first group of components is connected to a respective output of the third demultiplexer so that the respective first impedance matching network is arranged between the third demultiplexer and the respective second demultiplexer.

9. The system according to claim 8, wherein said second group of components is connected to a second output, distinct from each first output, of the first demultiplexer, so that the second impedance matching network is arranged between the first demultiplexer and said antenna for reading the RFID tag of the tray; or wherein said second group of components is connected to a respective output of the third demultiplexer, so that the second impedance matching network is arranged between the third demultiplexer and said antenna for reading the RFID tag of the tray.

10. The system according to claim 8, wherein a further demultiplexer is connected to the third demultiplexer, and wherein one or more first groups of components and/or the second group of components, and optionally still a further demultiplexer are connected to a respective output of said further demultiplexer.

11. The system according to claim 1, wherein said one or more demultiplexers comprise two or more demultiplexers connected to one another in cascade so as to define a cascade of demultiplexers.

12. The system according to claim 1, wherein each RFID antenna of said plurality of RFID antennas has a Q factor greater than 10.

13. The system according to claim 1, wherein all the RFID antennas for reading the RFID tags of the supports are passive.

14. The system according to claim 1, wherein one RFID antenna is provided for each support, each seat of the tray being adapted to be arranged at a respective RFID antenna.

15. The system according to claim 1, wherein the RFID antennas for reading the RFID tags of the supports are arranged so that a center-center distance, between the RFID antennas for reading the RFID tags of the supports is from 3 to 300 mm or from 5 to 15 mm.

16. The system according to claim 1, wherein each RFID antenna for reading the RFID tags of the supports has a width from 4 to 40 mm or from 15 to 35 mm, and/or a length from 4 to 40 mm or from 3 to 10 mm.

17. The system according to claim 1, wherein said RFID antenna for reading the RFID tag of the tray is distinct from said RFID antennas for reading the RFID tags of the supports.

18. The system according to claim 1, wherein the RFID tag of each support is an NFC tag; the RFID tag of each tray is an NFC tag; said at least one RFID interrogator is an NFC interrogator; and said RFID antennas of said plurality of RFID antennas are NFC antennas.

19. The system according to claim 1, wherein each tray has a width from 30 to 50 cm; and a length from 20 to 40 cm.

20. The system according to claim 1, wherein, when the supports are histology cassettes, each RFID tag is incorporated in a respective histology cassette; and when the supports are slides, each RFID tag is attached to the respective slide.

21. The system according to claim 1, wherein said component is adapted to be arranged below a resting surface of a tray.

22. The system according to claim 1, wherein the RFID antennas are arranged on a same surface or on several surfaces, distinct from one another.

23. The system according to claim 1, wherein each tray comprises a number of seats from 100 to 4096 or from 100 to 600 or from 200 to 300.

24. The system according to claim 1, wherein said at least one RFID interrogator is also capable of writing the RFID tags of the supports and the RFID tag of the trays.

25. The system according to claim 1, configured to read the position of each support in the tray by means of the RFID antenna at said support, to read the identification number of the RFID tag of each support, and to read the identification number of the RFID tag of the tray in which the support is arranged.

26. A cabinet provided with a system according to claim 1, the cabinet being provided with a plurality of components where a respective tray can be arranged.

* * * * *